(12) United States Patent
Xu et al.

(10) Patent No.: US 7,583,065 B2
(45) Date of Patent: Sep. 1, 2009

(54) HYBRID FILTER FOR HIGH SLEW RATE OUTPUT CURRENT APPLICATION

(75) Inventors: Ming Xu, Blacksburg, VA (US);
Yuancheng Ren, Blacksburg, VA (US);
Fred C. Lee, Blacksburg, VA (US);
Andrew P. Schmit, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 12/401,815

(22) Filed: Mar. 11, 2009

(65) Prior Publication Data

US 2009/0174378 A1 Jul. 9, 2009

Related U.S. Application Data

(62) Division of application No. 11/380,064, filed on Apr. 25, 2006, now Pat. No. 7,560,912.

(51) Int. Cl.
*G05F 1/614* (2006.01)
*G05F 1/563* (2006.01)

(52) U.S. Cl. ..................... 323/266; 323/269

(58) Field of Classification Search ............... 323/225, 323/226, 266, 268, 269, 273, 274, 350
See application file for complete search history.

(56) References Cited

U.S. PATENT DOCUMENTS

| | | | |
|---|---|---|---|
| 4,459,537 A * | 7/1984 | McWhorter | ............ 323/224 |
| 4,881,023 A * | 11/1989 | Perusse et al. | ............ 323/266 |
| 5,070,439 A | 12/1991 | Remson | |
| 5,258,701 A | 11/1993 | Pizzi et al. | |
| 5,321,348 A | 6/1994 | Vinciarelli et al. | |
| 5,744,944 A | 4/1998 | Danstrom | |
| 5,973,485 A | 10/1999 | Kates et al. | |
| 6,169,391 B1 * | 1/2001 | Lei | ............ 323/266 |
| 6,469,478 B1 * | 10/2002 | Curtin | ............ 323/266 |
| 6,791,302 B2 | 9/2004 | Tang et al. | |
| 6,801,027 B2 | 10/2004 | Hann et al. | |
| 6,861,827 B1 | 3/2005 | Yang et al. | |
| 6,912,144 B1 | 6/2005 | Clavette | |
| 7,034,511 B2 | 4/2006 | Schuellein et al. | |
| 7,058,373 B2 | 6/2006 | Grigore | |
| 7,109,689 B2 | 9/2006 | Schneider | |
| 7,560,912 * | 7/2009 | Xu et al. | ............ 323/266 |

* cited by examiner

*Primary Examiner*—Gary L Laxton
(74) *Attorney, Agent, or Firm*—Whitham, Curtis, Christofferson & Cook, P.C.

(57) ABSTRACT

An active linear regulator circuit in parallel with a filter capacitor of a switching voltage regulator injects current to a load only when the switching regulator and capacitor cannot supply adequate current to follow high frequency load transients in a manner which is compatible with adaptive voltage positioning (AVP) requirements. control of current injection and determination of the insufficiency of current from the switching regulator and capacitors is achieved by impedance matching of the linear regulator to the switching regulator. The linear regulator thus operates at relatively low current and duty cycle to limit power dissipation therein. By matching impedances and increasing the bandwidth of the switching regulator, filter capacitor requirements can be reduced to the point of being met entirely by packaging and/or on-die capacitors which may be placed close to or at the point of load to reduce parasitic inductance, as can the linear regulator.

11 Claims, 12 Drawing Sheets

HYBRID FILTER FOR HIGH SLEW RATE OUTPUT CURRENT APPLICATION

CROSS-REFERENCE TO RELATED APPLICATIONS

This application is a division of U.S. patent application Ser. No. 11/380,064, filed Apr. 25, 2006, now U.S. Pat. No. 7,560,912 fully incorporated herein by reference and assigned to the assignee of the present application, priority of which is hereby claimed.

BACKGROUND OF THE INVENTION

1. Field of the Invention

The present invention generally relates to power supplies for electronic devices and, more particularly, high current, low voltage loads of complex electronic devices such as computers and telecommunications devices which operate at high frequencies.

2. Description of the Prior Art

Recent developments in many types of electronic devices have caused power supply requirements to become much more stringent to the point that current power supply designs are becoming inadequate or impractical. For example, switching power supplies are well known for DC-DC conversion and operate by switching current from a relatively high voltage source which is then filtered, often using a series inductance, to maintain an approximate desired voltage on a bulk capacitor, often referred to as a filter capacitor. Switching frequency and/or duty cycle to control output voltage is determined by feedback of variation in voltage in a known manner. However, such feedback involves an unavoidable delay in the response to transient changes in load and limits accuracy of voltage regulation.

Thus, power supplies of this and other known types rely on the large capacitance value of the bulk or filter capacitor to supply potentially large transient currents. Such filtering with capacitors may be required in several stages (e.g. following the bulk capacitor) of a power distribution network where the network may branch or present a relatively long connection (such capacitors being referred to as decoupling capacitors) as well as at the point of load (where such capacitors are often physically located on the back of a CPU and referred to as packaging capacitors) such as at an integrated circuit package or even at various locations on an integrated circuit chip to minimize effects of voltage ripple and variation due to load transients and propagation thereof through the power distribution network from one portion of a circuit or device to another. The slew rate of current change is also compromised by the total capacitance presented by these filter and decoupling capacitors. Such effects are particularly evident in regard to current and foreseeable complex digital circuits such as microprocessors or telecommunications devices which operate at extreme clock speeds and where the load can change radically from one clock pulse to the next and parasitic inductance and capacitance of power connections may cause large changes in impedance of the power supply connections.

Moreover, the trend toward increased complexity and reduced size of integrated circuit chips has resulted in designs which operate at relatively lower voltages (e.g. less than 1V) and higher currents (e.g. 150 A or higher—also aggravated by increased numbers of active devices such as transistors formed on each chip) supplied through connections presenting potentially significant parasitic impedances, particularly as the trend toward higher clock frequencies continues. Further, as a matter of thermal management, some integrated circuits, notably microprocessors, specify a variation of supply voltage with load which is referred to as adjustable voltage positioning (AVP). Therefore, voltage regulation tolerance has become smaller and more stringent as well as more complex while the potential magnitude of current transients and voltage drops in power connections increases. It is projected that the capacitance requirements for bulk capacitors will increase by a factor of 2.5 for bulk capacitors, a factor of 13 for decoupling capacitors outside a device connection (e.g. at an IC socket or board) and a factor of 6 for so-called packaging capacitors within or closely associated with an IC package or on-chip to derive sufficient voltage regulation performance using current voltage regulator and filter design to meet current and foreseeable voltage regulation requirements. Such large increases in required capacitance can be better appreciated from the fact that increased filter and decoupling capacitance compromises slew rate and bandwidth of the voltage regulator due to increasing numbers of output capacitors for energy storage, thus requiring even greater capacitance to provide a given voltage regulation tolerance which is becoming more stringent, as alluded to above. Further, while numerous capacitor technologies are known for different ranges of capacitance value, required increases in capacitance of individual capacitors is invariably accompanied by increases in physical size of capacitors and larger capacitance values must often be implemented in technologies which require greater volume per unit of capacitance.

Other approaches to answering a need for increased current slew rate and improved transient response are summarized in an article entitled "Hybrid Power filter with Output Impedance Control" by Y. Ren et al., $36^{th}$ Conference on Power Electronics Specialists, pp. 1434-1440, Jun. 12, 2005, of which the inventors are co-authors and which is hereby fully incorporated by reference. However, each of these approaches has engendered corresponding problems and/or limitations rendering them inadequate to the requirements for providing power to current microprocessor and communications ICs. For example, a hybrid power supply noted therein provides a linear source in parallel with a switching regulator with the voltage loop closed through the linear source and the current from the linear source used as an error signal for the switching regulator. However, such an arrangement is inherently incompatible with adaptive voltage positioning (AVP) specified by manufacturers of microprocessors and other ICs of high functionality.

SUMMARY OF THE INVENTION

It is therefore an object of the present invention to provide a voltage regulator and power distribution system of increased bandwidth; allowing reduction of output capacitors in capacitance value and size.

It is another object of the present invention to provide a hybrid power supply filter arrangement which improves slew rate of change in current output and presents a reduced impedance to loads.

In order to accomplish these and other objects of the invention, a power supply and distribution network is provided comprising a voltage regulator including an output capacitor functioning as a current source, and a linear regulator functioning as a current source in parallel with the output capacitor.

In accordance with another aspect of the invention, a method is provided for reducing capacitance required for filtering output of a voltage regulator and/or increasing effective slew rate of said voltage regulator, comprising steps of setting bandwidth of the voltage regulator in accordance with a clock frequency of a load circuit receiving power from the voltage regulator, injecting current into a power supply connection when required power transients exceed a current slew rate of the voltage regulator.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
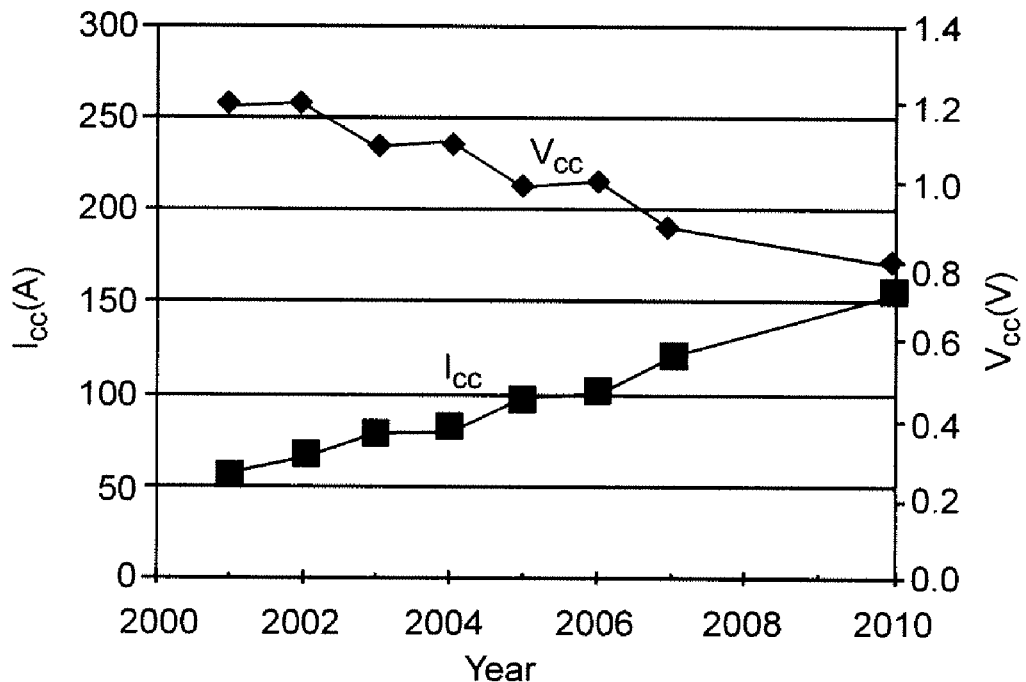
FIG. 1 is a graph of historical and projected voltage and current requirements for microprocessors.
Figure 2:
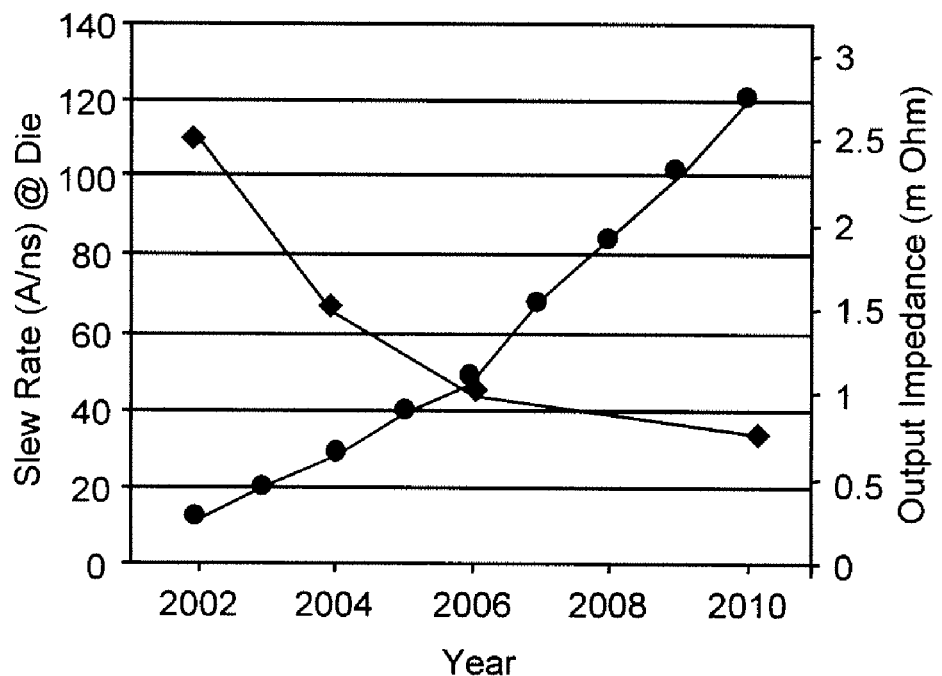
FIG. 2 is a graph of historical and projected values of slew rate and output impedance of power supplies and distribution networks of known design.

Referring now to the drawings, and more particularly to FIGS. 1 and 2, there is shown historical and projected future power supply current and voltage requirements and slew rate and output impedance for power supplies of current design for supplying power to microprocessors, respectively. As alluded to above, increases in integration density and reduction of minimum feature size regimes required to provide improvements in performance and functionality of microprocessors in recent years has led to a decrease in power supply voltage (e.g. to improve breakdown margins and to reduce voltage swing to reduce currents to capacitive elements such as gates of field effect transistors) from about 1.2 volts is 2001-2002 to about 1.0 volts at the present time with a further reduction to about 0.8 volts projected within the near future. Such a reduction not only reduces the voltage regulation tolerance (e.g. 10% of rated voltage) but imposes even more stringent requirements for voltage regulation accuracy. Over the same period, current requirements have substantially doubled from 50 to 100 Amperes with a further increase to 150 Amperes being projected as being required within a few years.

As alluded to above, increased filtering and decoupling capacitance as well as the number of stages of filtering and decoupling and the number of capacitors compromises slew rate of power supplies and it can be seen from FIG. 2 that the slew rate has increased from about 10 Amperes/nanosecond to over 120 Amperes/nanosecond while the clock speed of microprocessors and other integrated circuits has been increasing significantly. Further, the clock speed is largely determinative of the rate and magnitude of maximum load current change which the power supply and power distribution network must accommodate. Thus, higher frequencies present in the load current waveform increase the impedance of the power supply and power distribution system as seen by the load, due largely to the parasitic inductances and capacitances thereof and it can be seen from FIG. 2 that output impedance has, indeed, decreased from about 2.5 milliohms in 2002 to about 1.0 milliohms at present with a further decrease to about 0.8 milliohms being projected within the near future. These predictions carry a high degree of confidence since the degree of integration density and nominal clock frequencies are already known for designs which exist currently and which will be implemented at a commercial level at the projected times indicated.

Figure 3:
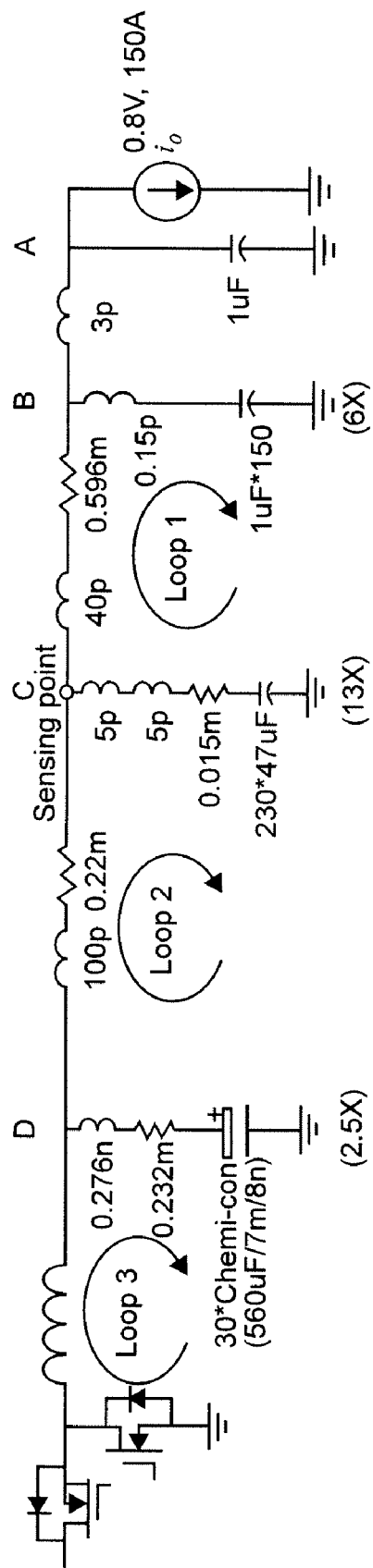
FIG. 3 is a schematic representation of a power supply and distribution network (with respect to a single point of load) of current design which will be useful in conveying an understanding of the principles of the present invention.

FIG. 3 schematically illustrates an equivalent circuit of a projected future switching regulator and power distribution network (with respect to a single point-of-load, for clarity) necessary to provide the voltage regulation performance to meet the requirements of foreseeable microprocessor and telecommunication ICs. Exemplary parasitic impedances at particular points of the power supply and distribution network are illustrated. For reference, the circuit to the right of point/node A in FIG. 3 represents, for example, an integrated circuit such as a microprocessor with an internal or even on-chip filter/decoupling capacitor (referred to as a packaging capacitor) which may be implemented in a distributed manner as a plurality of small (packaging) capacitors. (For example, the notation 1 µf*150 denotes 150 capacitors each having a value of 1 µf. or the equivalent capacitance, differently distributed) The inductance illustrated between points A and B is the parasitic inductance of the connection from node B, where a decoupling capacitor or a plurality thereof can be provided, to the chip. It should be noted that a decoupling capacitor at point B has only recently been considered necessary but is often provided at the present time, particularly as the impedance between points/nodes B and C has become significant at higher IC clock frequencies. Further, such decoupling capacitors are preferably provided at each power input pin of the IC which may number in the hundreds (or at groups thereof) to be as close as possible to the load.

Point/node C, also commonly referred to as the sensing point, corresponds to the termination of the power distribution network in accordance with prior designs and, topologically, would represent a point "downstream" from a point at which a power distribution network might branch and, in any case, is often relatively remote from the switching regulator (at and to the left of point/node D in FIG. 3) and thus the connection from point/node D to point/node C has relatively large and significant parasitic inductance and inherent resistance, as illustrated. Therefore, it has been the practice to provide a decoupling capacitor or a plurality thereof at such a point at respective loads to improve regulation and voltage stability and to prevent changes in load in one portion of the power distribution circuit or board from affecting other devices and circuits being powered from the same switching regulator.

Thus, the power distribution arrangement of FIG. 3 has at least three loops, identified in FIG. 3 by curved arrows. Each of these loops will exhibit resonance at some frequency and thus be an additional potential source of variation in the voltage which can be output therefrom as well as exhibiting a frequency dependent impedance which may limit the current which may be delivered to a following stage or a load. Accordingly, to meet more stringent requirements in regard to voltage regulation tolerances and to do so at high frequencies, the above-noted increases in capacitance (e.g. by a factor of 2.5 at point/node A, a factor of 13 at point/node B and a factor of 6 at point/node C) would be required. Such increases in capacitance are not economically feasible and would require more volume than is acceptable or, in some cases, physically possible while the potential for increase in parasitics of more numerous capacitors limit transient performance and efficiency. Moreover, as alluded to above, such increases in capacitance also compromise the bandwidth of the voltage regulator.

To provide a solution, the invention provides for increasing the bandwidth of the voltage regulator to provide for reduction or elimination of bulk/filter and decoupling capacitors by use of a hybrid filter design that includes active circuits, controlled by matching of impedances, capable of injecting current at the regulated voltage and which is conducive to the possibility of doing so in close physical proximity to the point of load. The basic principles of operation and implementation of the invention will now be explained with reference to FIGS. 4-12.

Figure 4:
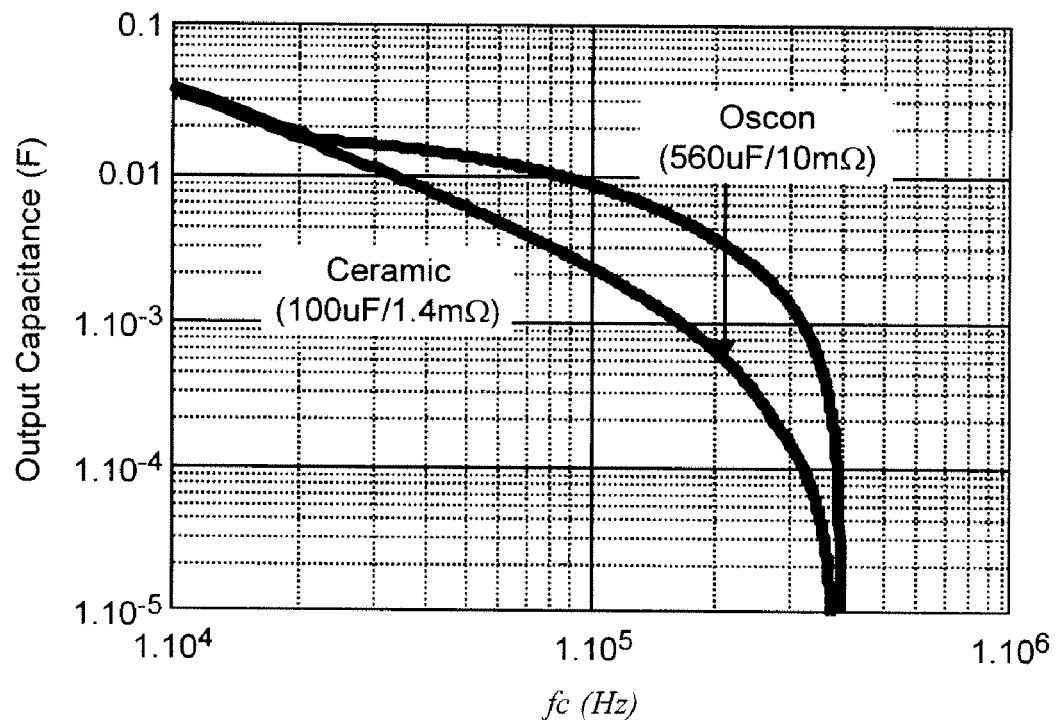
FIGS. 4 and 5 are graphical depictions of the relationship between voltage regulator bandwidth and of the bulk capacitance and decoupling capacitance, respectively.

FIG. 4 is a graphic depiction of the relationship between the required value of the output capacitance, also referred to above as a bulk or filter capacitance, at point/node D and control bandwidth, $f_c$. The increasingly negative slope of the required filter capacitance value with increasing frequency indicates that smaller filter capacitors provide sufficient regulation as switching frequency is increased. In other words, FIG. 4 graphically illustrates the trade-off between voltage regulator switching frequency and the required capacitance value for a given voltage regulation tolerance which reflects the fact that a higher switching frequency allows the switching regulator to more closely follow a load transient and directly supply a greater portion of the required transient current while the filter capacitor supplies correspondingly less.

Assuming a voltage regulator bandwidth target of 200 KHz and that the control bandwidth, $f_c=1/6*f_s$, the switching frequency, a voltage regulator switching frequency of 1.2 MHZ would be required. (The ratio of 1/6 is based on the control bandwidth necessary to avoid resonance between the voltage regulator module (VRM) inductor and capacitor in which the capacitor and inductor values are based on switching frequency. The ratio of 1/6 is valid for so-called buck step-down converters and different ratios may be valid for other types of converters.) At this target switching frequency/bandwidth, the technology of the filter capacitor should be changed from Oscon (a type of specialty polymer and aluminum electrolyte capacitor) to ceramic since the latter is more cost effective and has a smaller footprint for the required capacitance value. (For purposes of the present invention, the difference between Oscon and ceramic capacitors is a function of the respective per-piece capacitance, resistance and inductance. Both types of capacitor have a slope of approximately −2 at low frequencies. Oscon capacitors have a much lower Q-factor and the slope becomes more negative as compared with ceramic capacitors as frequency/bandwidth are increased.) Also, the capacitor value sufficient to provide a given degree of regulation varies as a function of the internal resistance of the capacitor and a reduced internal resistance allows a smaller capacitance to be employed, as depicted by the arrow at $f_c$=200 KHz bandwidth. That is, the target bandwidth of $f_c$=200 KHz allows a significant reduction in required capacitance and space required therefor and augmentation of that effect by substitution of capacitor technology.

At a second voltage regulator bandwidth target of 350 KHz where the required filter capacitance decreases markedly with control frequency/bandwidth increase, a voltage regulator switching frequency of 2.0 MHZ is required. However, as indicated in FIG. 4, at such a bandwidth, the bulk/filter/output capacitor(s) can be completely eliminated since sufficient filtering can be achieved by capacitors (e.g. cavity, packaging, etc. capacitors) further "downstream". That is, at this point, downstream capacitors are sufficient to handle higher-frequency transients.

Figure 5:
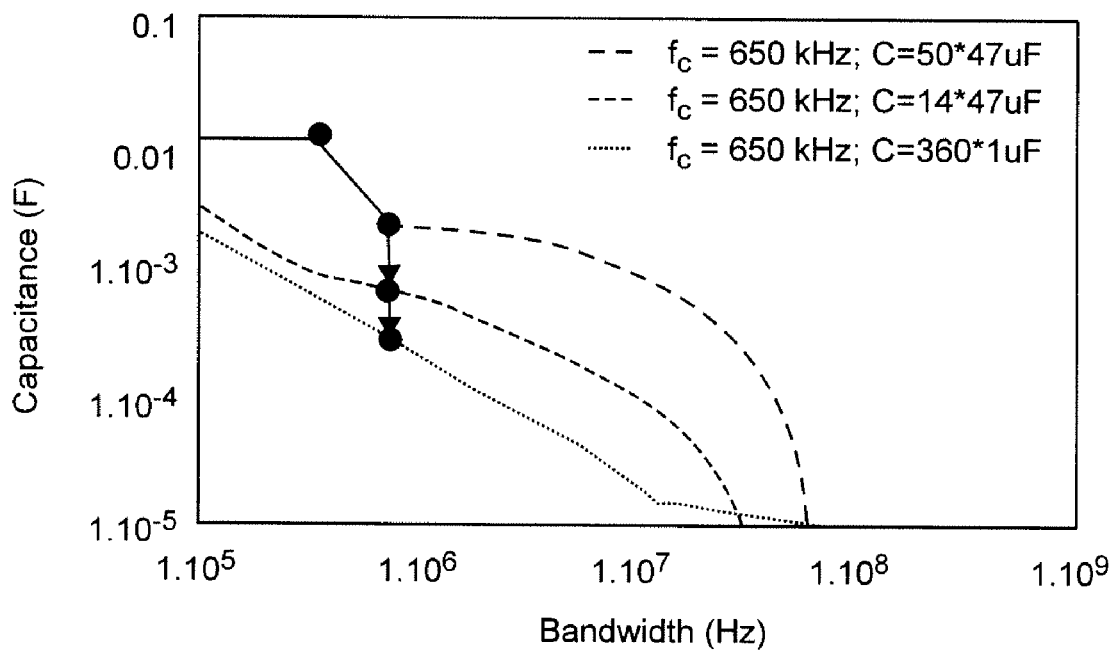

Similarly, FIG. 5 illustrates a generally similar relationship between required capacitance of decoupling capacitors (e.g. at point/node C), particularly in the vicinity of a third bandwidth target of 650 KHz and a voltage regulator switching frequency of 4.0 MHZ which would be considered to be extremely aggressive design, if reliably achievable at all (since parasitic inductance is difficult to control and may not be accurately determinable). The solid portion of the top curve is based on the current power delivery structure and shows that, at this frequency and bandwidth, the number of decoupling capacitors can be reduced in number from two hundred thirty to only fifty. However, beyond such a frequency/bandwidth, because the equivalent series inductance (e.g. of the power supply connection(s) and the decoupling capacitors), referred to as ESL (which causes unwanted high impedance at very high frequencies which the VRM, being upstream from the decoupling capacitors, cannot overcome), and interconnection parasitics dramatically hinders the capacitance reduction as the bandwidth increases, it is not necessary to push the bandwidth higher in regard to current power delivery structures. In other words, at higher switching frequencies/bandwidth, the parasitic inductances increases impedance such that no further increase in supply of power directly from the VRM can be achieved and the remaining amount of required power which must be supplied from the decoupling capacitors cannot be further significantly reduced even though the parasitic inductance of the coupling capacitor(s) may contribute to the ESL while ESL may be reduced by increase of capacitance.

Figure 17:
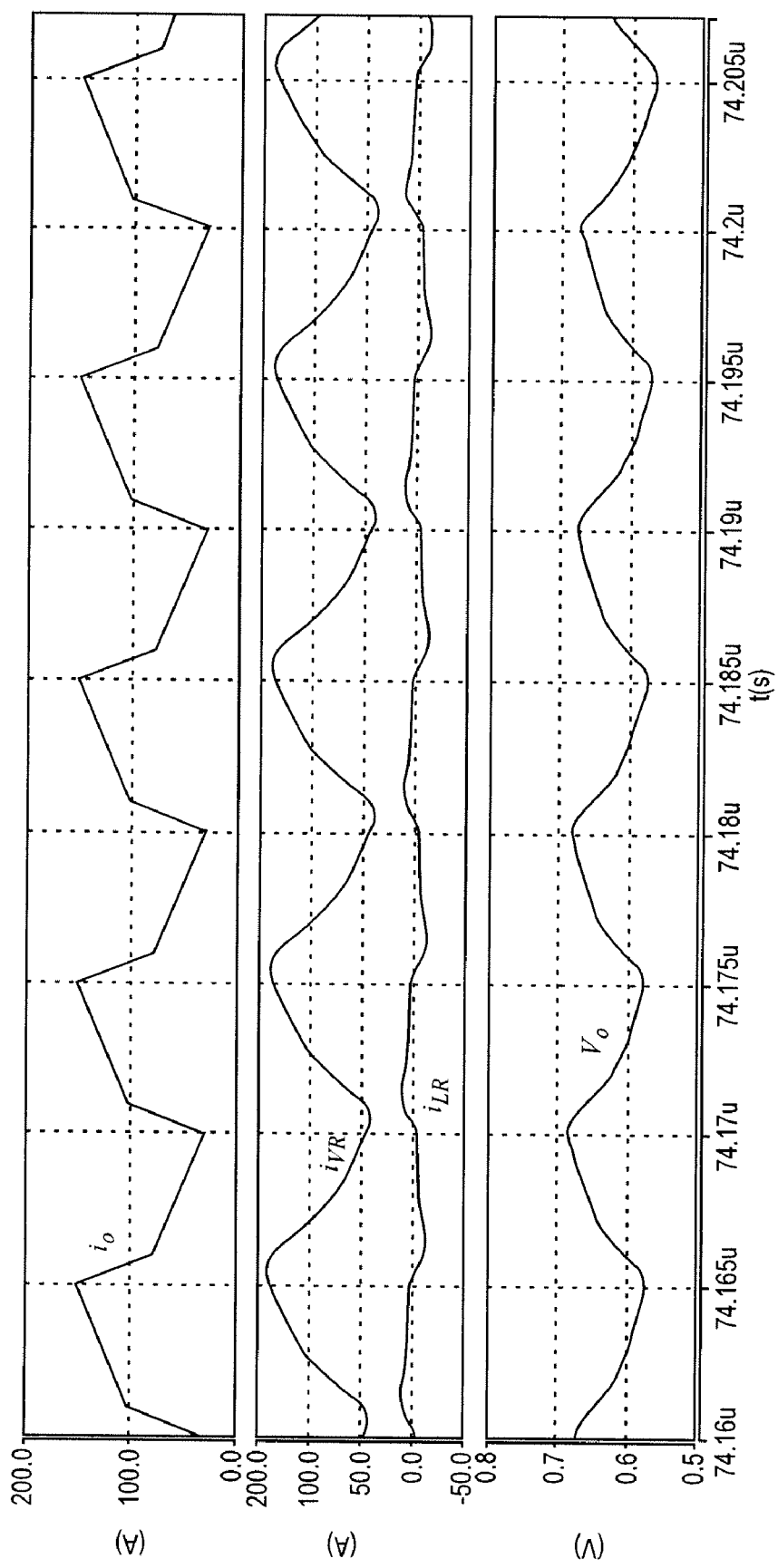
FIG. 17 illustrates simulated performance of the invention for the worst case load transient of FIG. 8.

If, however, the parasitic inductances can be reduced by relocation of the voltage regulator from the motherboard to an organic land grid array (OLGA) which is a type of low impedance substrate, as shown in FIG. 17, the number of decoupling capacitors can be reduced to 14*47 μF at the 650 KHz bandwidth, as shown in FIG. 5. Further, as shown in FIG. 5, a suitable capacitance value can also be distributed to 360*1 μF packaging capacitors (e.g. capacitors generally located beneath the microprocessor and/or attached to the bottom of the microprocessor package, as reflected in such nomenclature). That is, the required total capacitance value can be further reduced by placing the capacitors closer to the load thus effectively allowing omission of decoupling capacitors and performing their filtering and current supply function with packaging capacitors.

The linear regulator in accordance with the invention, as will be described below, and preferably placed electrically between the packaging capacitors and the microprocessor may replace or allow omission of many packaging capacitors but, in general, it is preferred to use as many packaging capacitors as space or other constraints allow, typically twenty-three to twenty-five, which may thus be used directly as output capacitors. The reduction of capacitance which may be attained is due to the much smaller ESL (since the ESL is reduced as the quantity of capacitance is increased). In order to further reduce the number of packaging capacitors to a number which may be conveniently accommodated, use of a linear regulator rather than a switching regulator (which is limited by $f_s$) has been proposed in order to answer the stringent transient response requirement. A linear regulator provides the advantage of being able to use a higher input voltage and, therefore, a higher slew rate can be obtained. However, the major drawback of the use of linear regulators is their severe power dissipation; reduction of which has proven intractable prior to the present invention.

The basic concept of the invention is to use a linear regulator only to augment passive devices (e.g. capacitors) and to do so as part of a plan to reduce undesired impedances by placing the VRM, capacitors and linear regulator closer to the microprocessor or other load. By controlling the output impedance at the linear regulator, it can be used only at very high frequencies and lower losses may thus be achieved because the linear regulator is used only at higher harmonics of any transients. By the same token, controlling the linear regulator through impedance matching rather than through any control signal allows instantaneous response without signal propagation delay and assures that the linear regulator will supply current only when the much more efficient capacitors cannot fully follow and provide current corresponding to a load transient; thus minimizing current provided by the linear regulator to maximize efficiency thereof.

Figure 6:
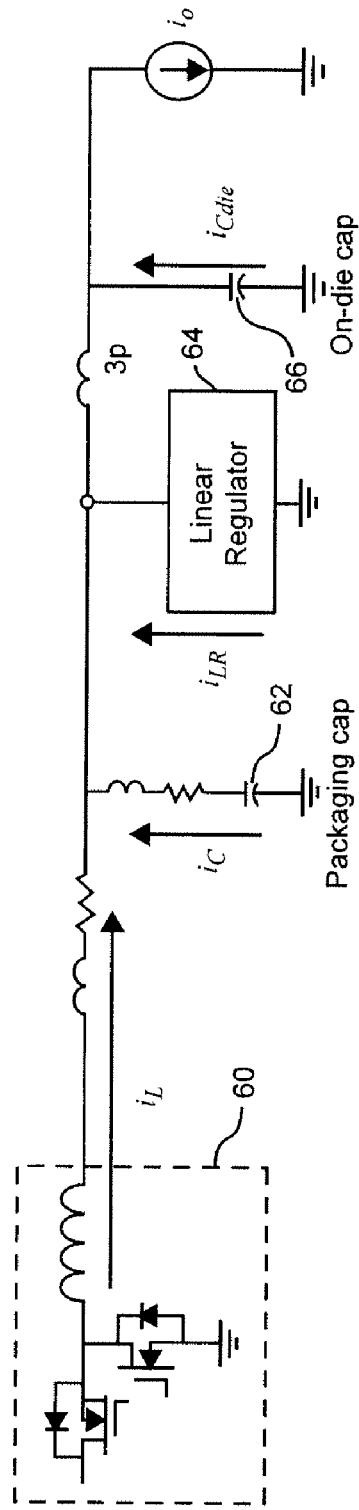
FIG. 6 is a schematic depiction of a power supply and distribution network including the hybrid filter in accordance with the invention.

FIG. 6 schematically illustrates the hybrid filter concept in accordance with the invention. In comparison with the current approach to power supply and power distribution network design of FIG. 3, it will be immediately noted that no bulk/filter capacitor is included in the switching regulator 60 and the packaging capacitor(s) 62 is used directly as the output capacitor, as alluded to above. A linear regulator 64 is placed in parallel with the output/packaging capacitor 62 and both serve as current sources for the load 68 to accommodate current transient requirements, as does the on-die capacitance 66 as will now be explained with reference to FIG. 7.

Figure 7:
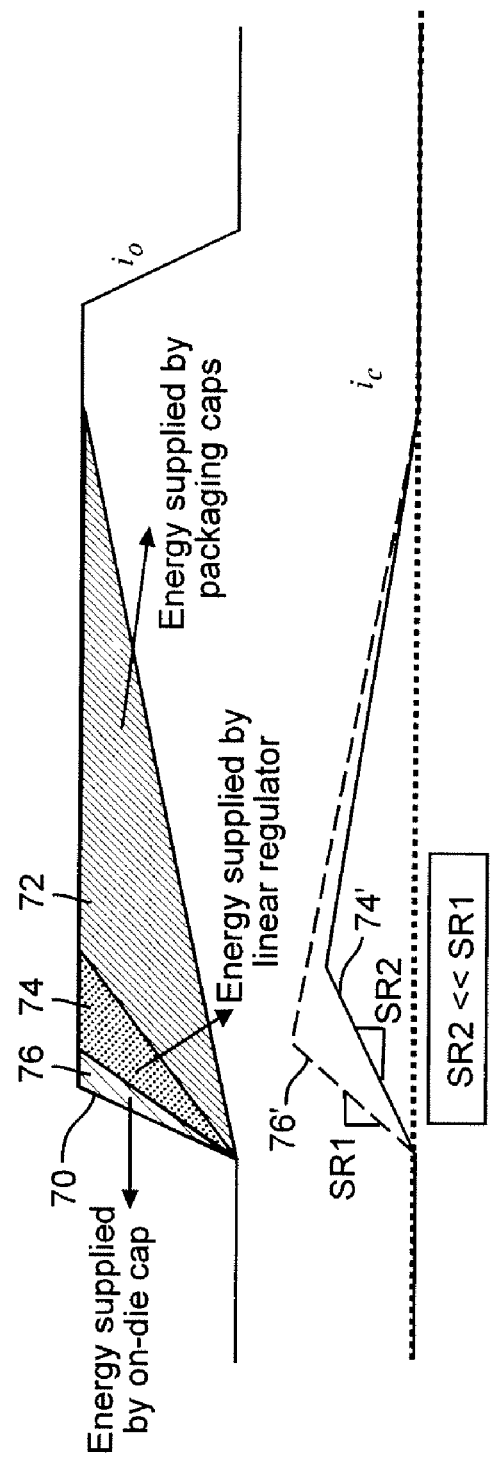
FIG. 7 illustrates the conceptual waveform of the hybrid filter in accordance with the invention.

The upper trace of FIG. 7 represents a current pulse $i_o$ of idealized form with the leading edge 70 of the pulse representing the required slew rate of the power supply and distribution network imposed by the load. Within this current pulse, line 72 represents the low slew rate of the switching regulator and the area below line 72 represents the energy supplied from the switching regulator 60 of FIG. 6. Line 74 represents the time constant of packaging capacitor 62 with its series parasitic inductance and inherent resistance as illustrated in FIG. 6 and the area between lines 72 and 74 represents the energy transferred from the packaging capacitor during the current pulse. Similarly, line 70 represents the time constant of the on-die capacitor 66 (since the inductance and resistance of an on-die capacitor is extremely small) while area between line 70 and line 76 corresponds to the amount of energy which can be transferred therefrom during the pulse. The remaining area between lines 74 and 76 thus represents the energy which is provided from the linear regulator 64. The dashed lines in the lower portion of FIG. 7 is a plot of the current required by the load other than that from the switching regulator 60 and on-die capacitor 66 where line 76' represents the required slew rate SR1. Solid line 74' represents the same area as that between lines 72 and 74 discussed above and corresponding to the energy transferred from the packaging capacitor. It can be seen from a comparison of these areas that SR2<<SR1 and is much less stringent because of the injection of current from linear regulator 64. By the same token, the amount of current and energy provided by the linear regulator is relatively small and occurs during only a short portion of the current pulse (as will be even more evident from FIG. 9, as will be discussed below). Therefore, even though linear regulators characteristically exhibit severe power dissipation, the total power dissipated by the linear regulator placed in a hybrid filter in accordance with the invention can be reduced to an acceptably low level while the duty cycle of current injection is also relatively low which facilitates thermal management. Thus the provision of a linear regulator as a current injector can achieve beneficial effects on power supply performance far beyond those possible with even the most aggressive designs in accordance with previously known technologies. Thus the advantages of the high efficiency of capacitors and the fast transient capability of linear regulators (augmented by control through impedance matching) can be simultaneously achieved while obtaining optimum use of capacitors which cannot be eliminated to advantage (to supply the lower frequency transient power requirements) and overcoming most of the undesired effects of parasitic inductance of capacitors and power dissipation of linear regulators and provision of seamless integration of the VRM, packaging capacitors and linear regulator with full compatibility with AVP, as will be further explained below.

For example, at the present time, a 2 MHZ switching frequency, $f_s$, is currently considered to be aggressive switching regulator design. To use a switching regulator at the location proposed for connection of the linear regulator in accordance with a preferred embodiment of the invention would require a bandwidth, $f_c$, of about 1.1 GHz or, using the 1/6 ratio discussed above, a switching frequency, $f_s$, of about 6,600 MHZ, greater than three thousand times the switching frequency of switching regulators of current aggressive design and which is not reasonably possible in view of the impedance due to ESL and the relationship of ESL and capacitance discussed above.

The key to implementing this principle of operation is to properly design the output impedance of the linear regulator 64 and the switching regulator 60. One suitable technique of analysis and design sufficient to allow practice of the invention by those skilled in the art will be described below in connection with FIGS. 8-12. Of course, many other suitable techniques of circuit analysis and synthesis will become apparent to those skilled in the art in view of this example.

Figure 8:
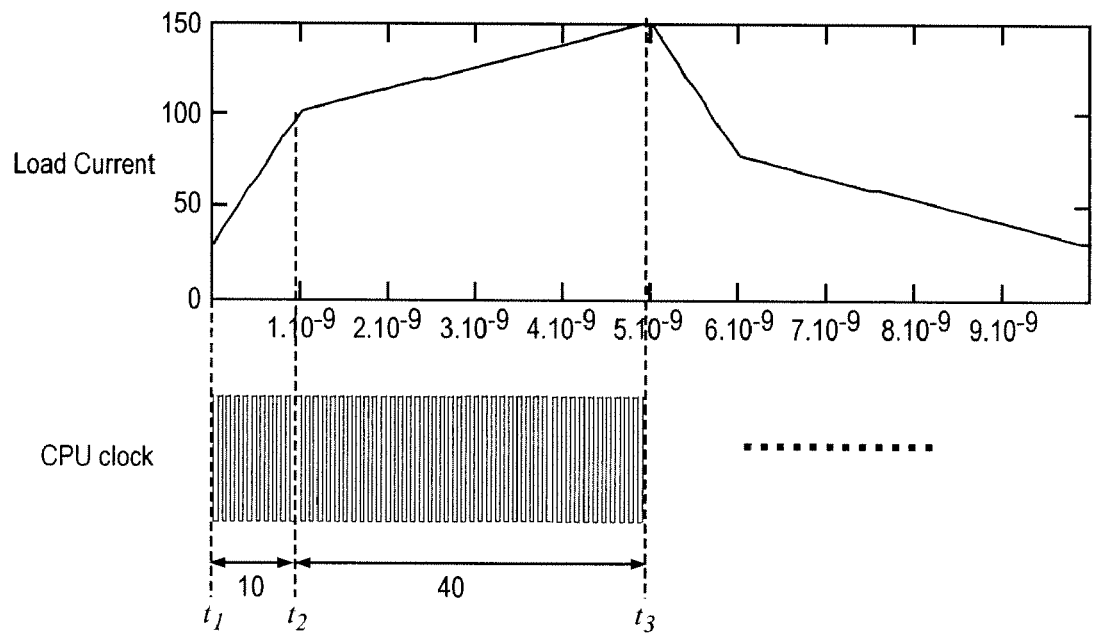
FIG. 8 illustrates a worst case load transient.
Figure 9:
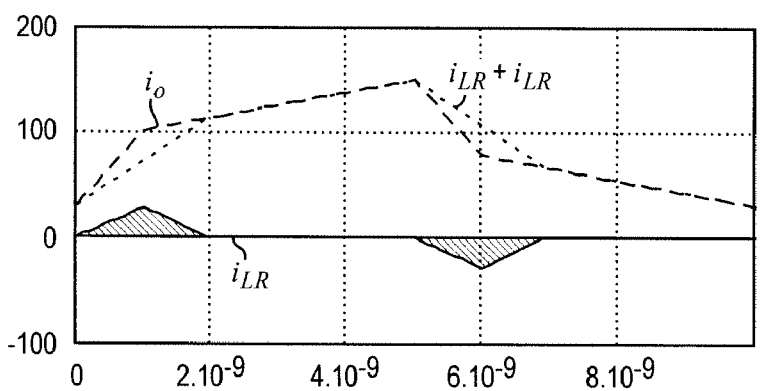
FIG. 9 illustrates derivation of desired linear regulator waveforms in regard to the load transient of FIG. 8 in accordance with FIG. 7.

FIG. 8 shows a worst case transient waveform in which the maximum di/dt occurs immediately after the conclusion of the maximum di/dt of the opposite sign. (This case is considered to be a "worst case" waveform since any less aggressive waveform would be handled to a greater degree by the packaging capacitors.) This waveform is scaled to the frequency of the load circuit clock to which the switching frequency of the switching regulator is also scaled. The waveform has two portions in a half cycle of the waveform: an initial portion with current increasing at the maximum slew rate of the power distribution system for about 10 clock cycles or 20% of a half-cycle of the transient waveform and a second portion with current rising at the maximum slew rate of the switching regulator for about 40 clock cycles or about 80% of the half-cycle of the transient waveform. The second half-cycle is an inversion of the first portion. The upper trace of FIG. 9 shows the same worst case waveform $i_o$ of FIG. 8 with the current waveform $i_L + i_C$ which can be supplied by the switching regulator and the packaging and on-die capacitors and thus having a lower maximum slew rate superimposed thereon. As described above in connection with FIG. 7, the difference between these waveforms corresponds to the current and energy supplied by the linear regulator 64 (FIG. 6) which is depicted by shaded portions of the lower trace of FIG. 9. The waveform of the current supplied by the linear regulator 64 in this worst case example is thus seen to be a small triangular pulse of relatively low current and duty cycle which limits the linear regulator power dissipation, alluded to above.

Figure 10:
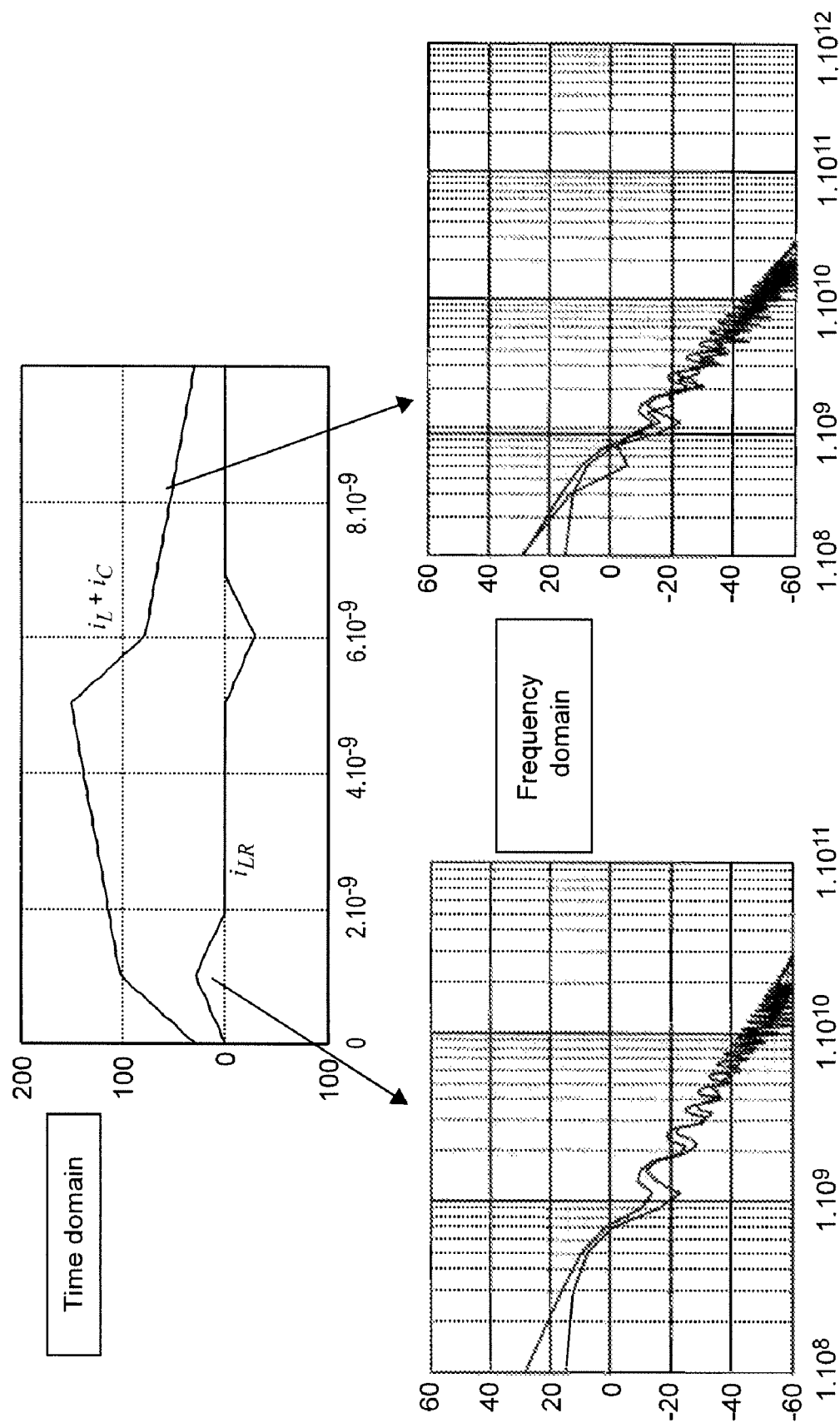
FIG. 10 illustrates conversion of the desired linear regulator waveform of FIG. 9 from the time domain to the frequency domain.
Figure 11:
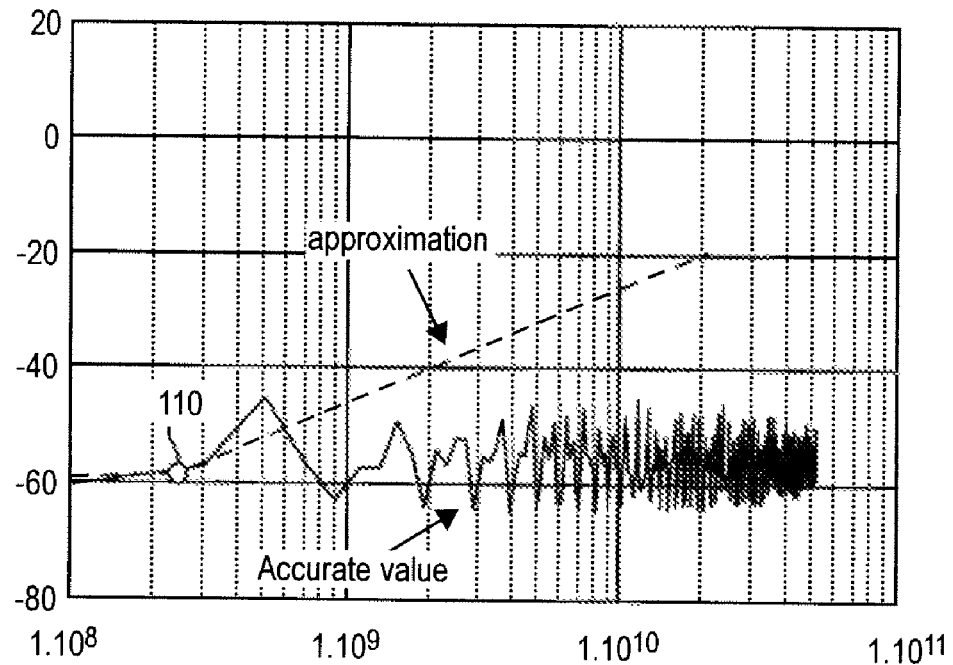
FIGS. 11 and 12 are frequency domain graphs of the output impedance of the switching regulator and the linear regulator, respectively, and approximations thereof for practical implementation of the invention.
Figure 12:
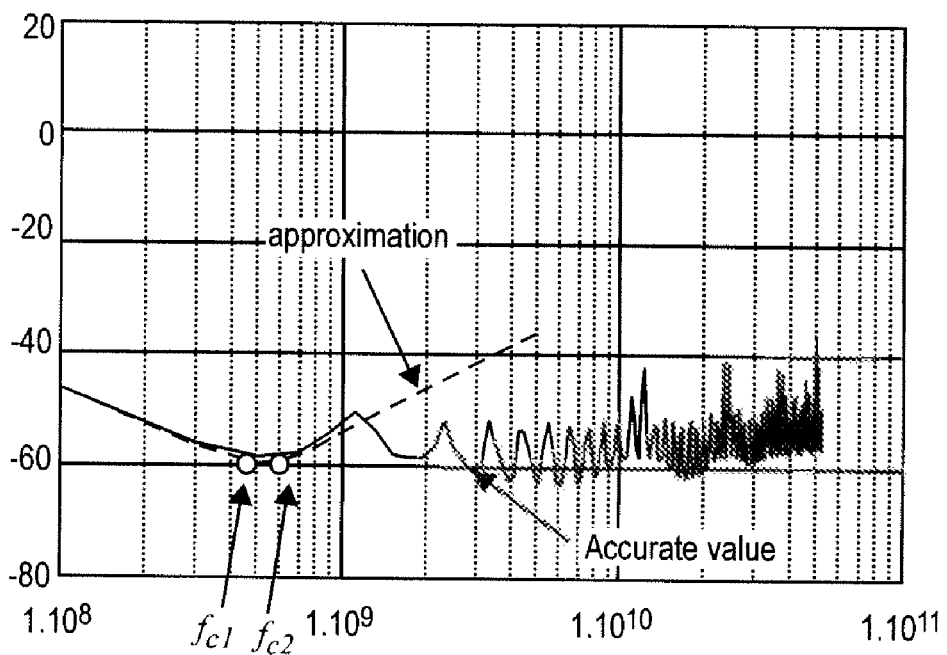

To obtain this response from the linear regulator, this time-domain waveform may be placed in the frequency domain by suitable transformation or simulation well-understood in the art as depicted in FIG. 10. After the desired current waveform in the frequency domain is achieved, the desired output impedance of the linear regulator and the switching regulator can be easily derived using the equations:

$$Z_{o\_LR}/Z_{o\_SR} = i_{SR}/i_{LR} \quad (1)$$

and $$(Z_{o\_LR} * Z_{o\_LR})/(Z_{o\_LR} + Z_{o\_LR}) = R_{droop} \quad (2)$$

where the subscripts LR and SR denote the linear regulator and the switching regulator, respectively, and $R_{droop}$ is the droop resistance or the amount the load/microprocessor voltage is required, by the manufacturer, to decrease as the load it represents increases in order to maintain power dissipation and other operational parameters within design limits. Implementation of such a droop is referred to as adaptive voltage positioning (AVP) alluded to above. These impedances of the switching regulator and the linear regulator are graphically depicted as a function of frequency in FIGS. 11 and 12, respectively. The actual impedances are too complex to be accurately modeled and practically realized in a compensating circuit in a feedback path to control the linear regulator as will be described below but may be approximated as illustrated by the dashed lines in FIGS. 11 and 12. (It should be noted in this regard that the apparent divergence of the dashed lines from the actual impedances above $f_{c1}$ and $f_{c2}$ which are two corner frequencies of the desired linear regulator output impedance, is not critical or even relevant to the successful practice of the invention to achieve its meritorious effects but is convenient for simulation in view of the likelihood of output impedance of the microprocessor will be lower than the linear regulator at frequencies above 1 GHz.) It is preferred, however, but not particularly critical to the practice of the invention for the impedance of the linear regulator at frequencies $f_{c1}$ and $f_{c2}$ to correspond to an impedance such that the impedance of the linear regulator approximately matches the impedance of the switching regulator at about 200 MHZ as indicated by point 110 of FIG. 11. At a frequency point where the impedances match, the linear regulator and the switching regulator will be providing equivalent currents such that as the transient frequency increases the lower impedance of the linear regulator allows it to provide increased current as the switching regulator and capacitors deliver less current as the ESL of the capacitors increases.

Figure 13:
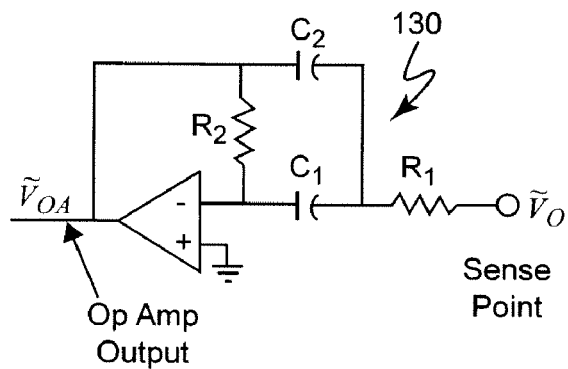
FIGS. 13 and 14 are schematic depictions of preferred forms of the compensator and the power amplifier, respectively, for the linear regulator in accordance with the invention.
Figure 13A:
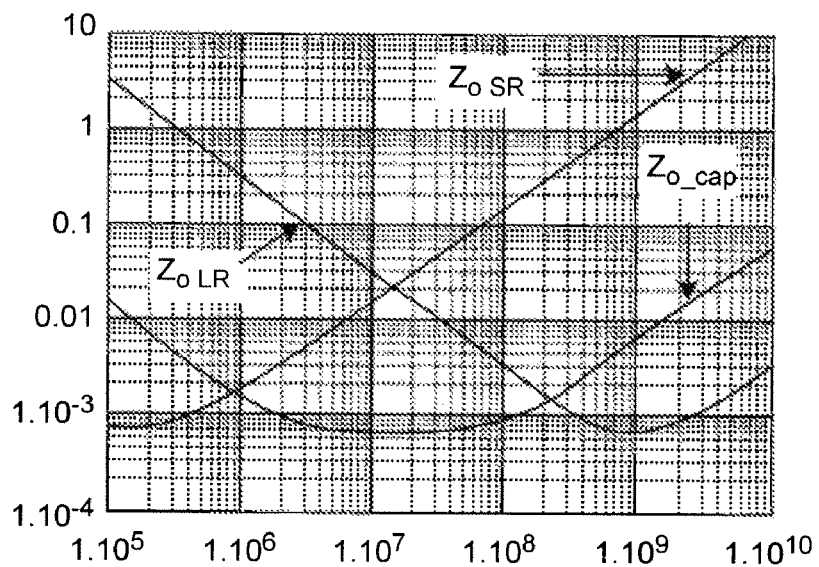
FIG. 13A is a graph of output impedance as a function of frequency of the switching regulator, capacitors and the linear regulator.

That is, as a practical matter, the switching regulator bandwidth, by design, is $f_{c1}$, at which point, the linear regulator should preferably have a lower output impedance. Conversely, an impedance match at this frequency assures that the linear regulator cannot deliver significant current at lower transient frequencies where the impedance of the switching regulator and capacitors is less and adequate current can be supplied therefrom. The respective impedances of the linear regulator, switching regulator and capacitors as a function of frequency are illustrated in FIG. 13A (which is substantially a superposition of FIGS. 11 and 12 with the capacitor impedance overlaid thereon. It can also be seen from FIG. 13A that a relatively low output impedance is maintained by at least one (in order of increasing frequency) of the switching regulator, the capacitors and the linear regulator for a frequency range of over four decades beyond the frequency at which the impedance of the switching regulator begins to increase.

The design of the switching regulator with which the hybrid filter of the invention may be employed merely follows conventional practice and the adaptive voltage positioning (AVP) design specified by the chip designer/manufacturer. The linear regulator principally comprises a compensator and a power amplifier. A preferred design for the compensator 130 is illustrated in FIG. 13 which is simply an operational amplifier having an input impedance network and a feedback impedance network including RC connections as indicated, for example, by R1, R2, C1 and C2 having time constants appropriate to providing a low output impedance at the frequencies to be matched in the impedance curves of FIGS. 11 and 12 and which assure that the power amplifier of the linear regulator of the hybrid filter will inject current into the power supply connection only when required power transients exceed a current slew rate of the switching voltage regulator and filter capacitors, however the latter may be embodied. It should be noted in regard to this feedback circuit is connected to the sense point (corresponding to point B in FIG. 3, upstream of the current injection point of the hybrid filter) and that no voltage reference is needed but only an input, $\tilde{v}_o$, to the compensator which represents the perturbation of the voltage at the sensing point. Rather, the operational amplifier with its feedback circuit should have sufficient bandwidth to ensure that it holds a −180° phase shift out to the corner frequency $f_{c2}$ in FIG. 12. To achieve this, the operational amplifier would need a gain-bandwidth product of at least $1/R_{droop} * f_{c2}$. Anything beyond this provides additional assurance that the propagation delay is negligible.

Figure 14:
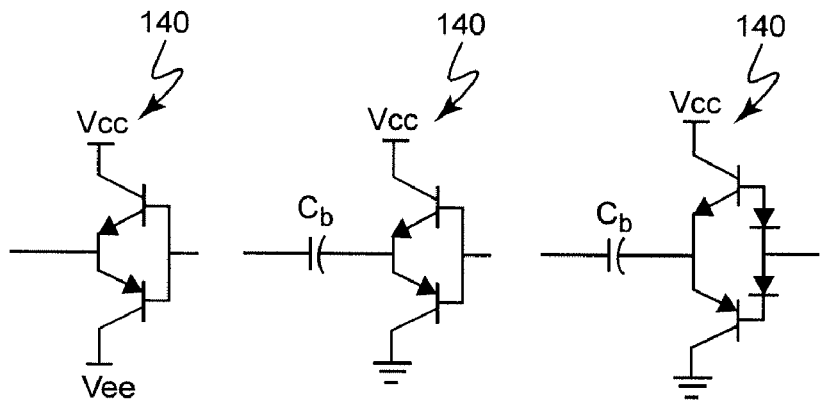

Three exemplary preferred designs of the power amplifier circuit 140 are illustrated in FIG. 14. The preferred power amplifier structures illustrated are of the well-understood push-pull configuration but the power amplifier circuit is not at all critical to the practice of the invention and many other suitable circuits will be evident to those skilled in the art. It should be noted, however, that the transistors of this amplifier are operated in the forward-active region, contrary to most other attempts to provide enhanced transient response. Further, in combination with proper coupling to the compensator, this mode of operation can be performed without instability by proper design of the RC input circuits thereto and the output capacitor as described in the above-incorporated article whereas instability was encountered in early attempts to utilize such a configuration.

Figure 15:
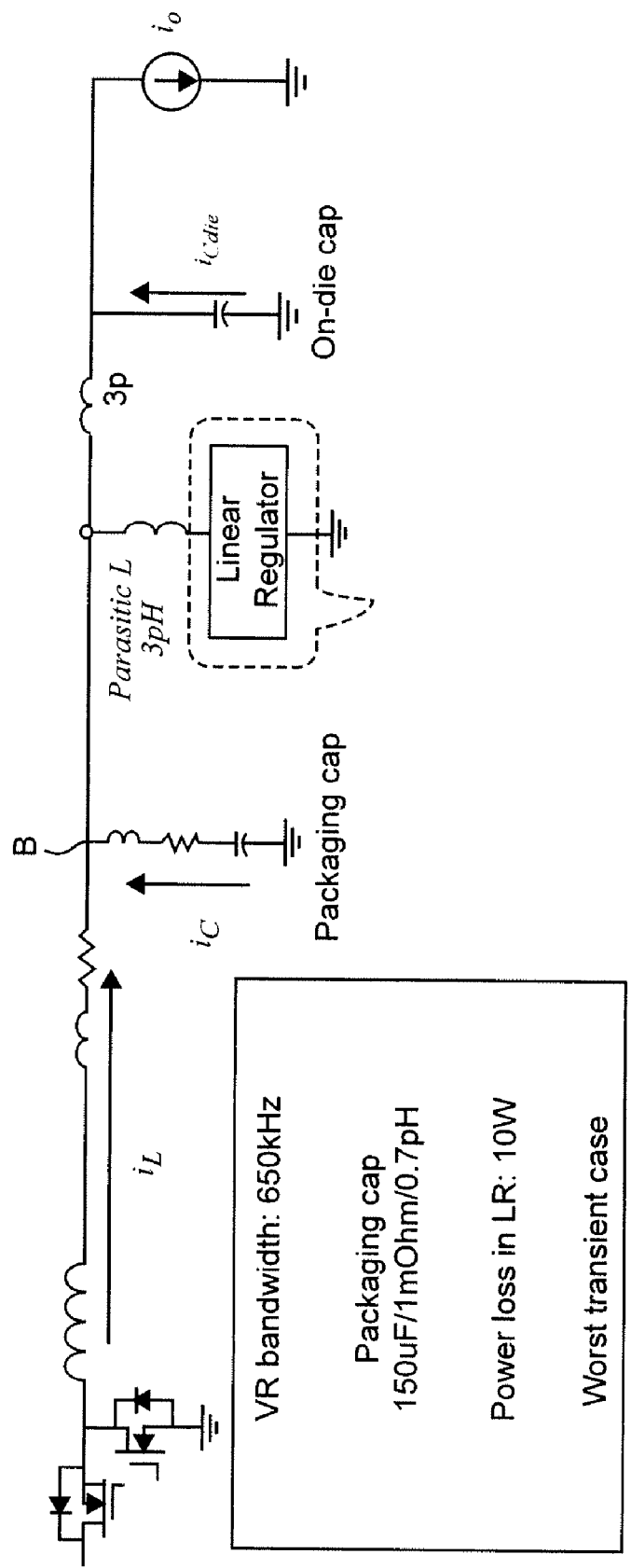
FIG. 15 is a schematic diagram of a preferred implementation of the invention corresponding to the more generalized depiction of FIG. 6.
Figure 18:
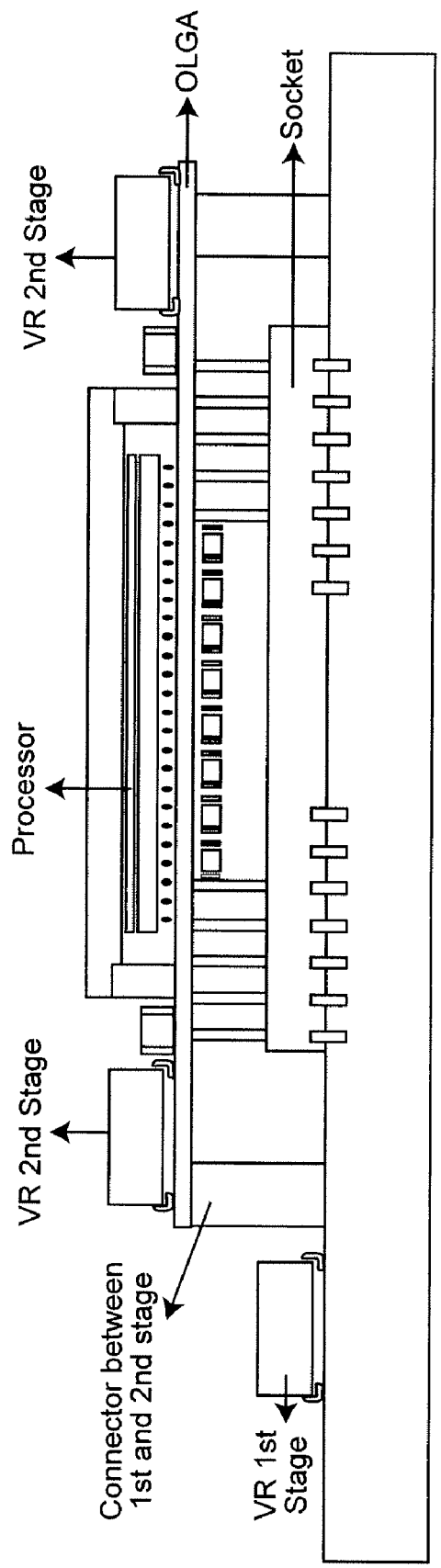
FIG. 18 is a side or cross-sectional view of a preferred form of power delivery structure for application of the invention.

FIG. 15 schematically illustrates an equivalent circuit of a preferred embodiment of the invention constructed as illustrated in FIG. 18 and corresponding to the more generalized depiction of FIG. 6. The parasitic inductance of the linear regulator connection can be held to about 3 pH by locating the linear regulator adjacent to the processor on an organic land grid array (OLGA) above the microprocessor/IC socket as alluded to above.

Figure 16:
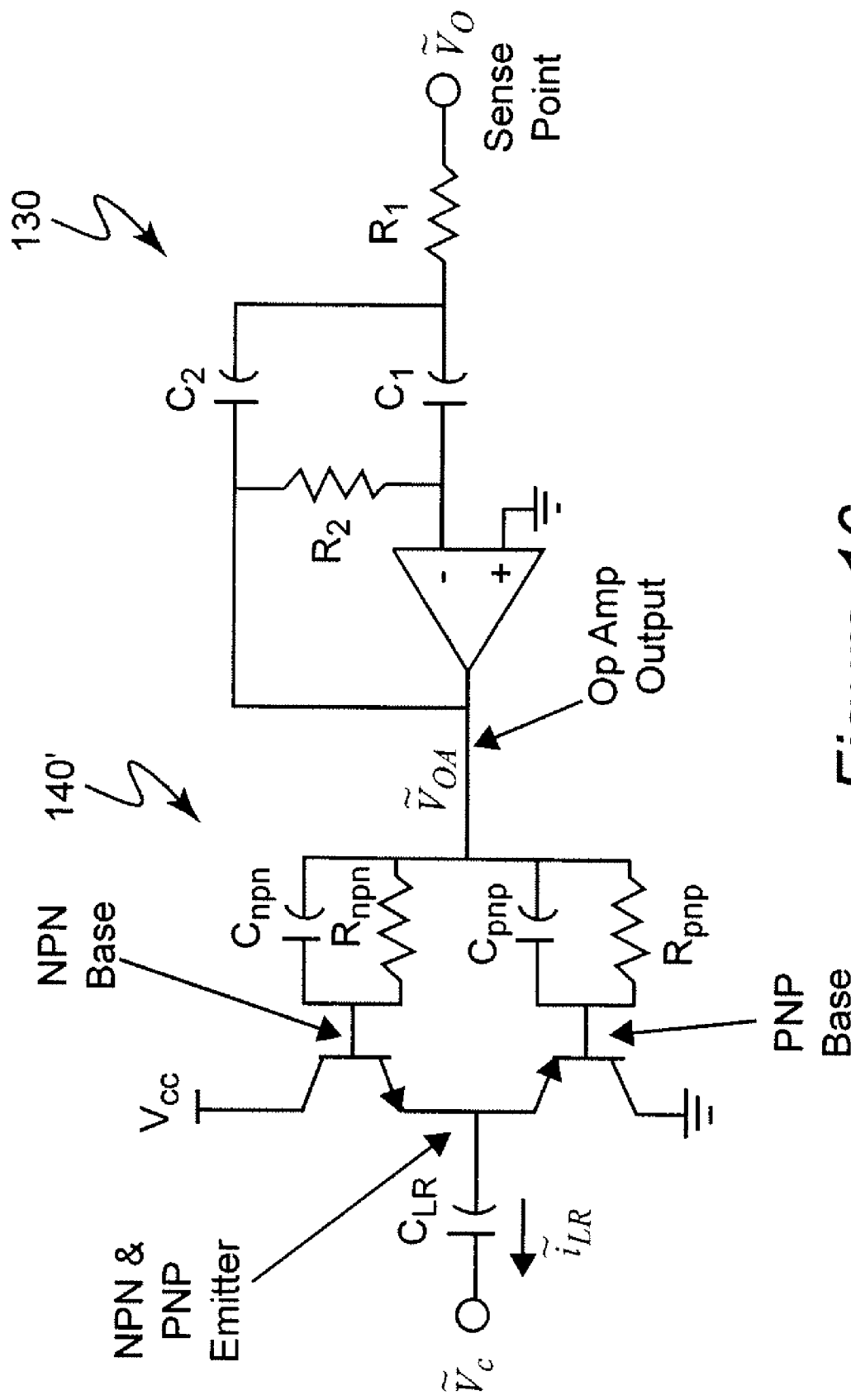
FIG. 16 shows a preferred implementation of the circuits of FIGS. 13 and 14 to form a preferred embodiment of the linear regulator of FIG. 15.

FIG. 16 is a schematic diagram of a preferred embodiment of the linear regulator in accordance with the invention formed by the combination of circuits 130, 140 of FIGS. 13 and 14 (including coupling circuits to PNP and NPN transistors for push-pull operation, depicted as amplifier 140' having an input, $\tilde{v}_o$, derived from sense point B in FIG. 15 which was used for simulation of the operation of the invention and FIG. 17 graphically illustrates the results thereof. (It should also be appreciated that the voltage at point B is also the output voltage from the first stage switching regulator as seen near the on-die capacitor. As pointed out above, however, $\tilde{v}_o$ represents the perturbation at the sensing point and does not include the DC, or average, voltage but does represent disturbances to the switching voltage.) The simulated current waveforms closely approximate the theoretical waveforms discussed above in connection with FIGS. 7, 9 and 10, particularly $i_{LR}$, the current contribution of the linear regulator, confirming the low current and low duty cycle which limit power dissipation of the linear regulator.

Also, in accordance with the results of this simulation, it is seen that the output/packaging capacitance can be reduced by over 60% and ESL can be ten times larger in comparison with the prior art; indicating that capacitance requirement for the capacitor (e.g. the packaging capacitor) are not stringent in the context of the hybrid filter in accordance with the invention. Further, because the linear regulator functions as a current source, it is not sensitive to the parasitic inductance of the path between the linear regulator output and the microprocessor or other load.

The concept of the hybrid filter using a linear regulator can be extended to a point-of-load converter since the circuits of FIGS. 13 and 14 are relatively simple and of few components and thus may be placed directly on the chip or die with the circuits which they supply. This application of the invention may be of particular advantage in telecommunications devices to dramatically reduce the number of capacitors and total output capacitance required.

In view of the foregoing, it is seen that the invention provides a solution to more stringent power supply and distribution network requirements including adaptive voltage positioning as voltage is reduced, current increased and extreme clock rates are employed. Rather than increasing required capacitance to obtain adequate regulation which compromises slew rate of switching regulator power supplies, the invention allows the capacitance to be drastically and dramatically reduced while accommodating unavoidable parasitic impedances which become significant at high frequencies. The linear regulator functions as a current source and can be placed close to the point-of-load to limit parasitic inductance while power dissipation thereof is limited by low current requirements and low duty-cycle operation such that the overall power supply in accordance with the invention is not significantly less than the efficiency of the switching regulator. Filtering requirements may be easily met by reduced capacitance values which may be readily and conveniently provided. The performance of the invention for meeting transient load changes is many times and several orders of magnitude beyond the capability of the most aggressive designs in accordance with known switching regulator technology.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A power supply and distribution network comprising
   a voltage regulator,
   a capacitor, for filtering output of said voltage regulator in said distribution network, said capacitor functioning as a current source for a load, and
   a linear regulator functioning as a current source in parallel with said capacitor and having an impedance matched with an output impedance of said voltage regulator, whereby said power supply and distribution network provides reduction of capacitance required for filtering output of said voltage regulator and/or increases effective slew rate of said power supply above that of said voltage regulator.

2. A power supply as recited in claim 1, wherein said linear regulator includes an amplifier and a compensation circuit.

3. A power supply as recited in claim 2, wherein said compensation circuit performs impedance matching.

4. A power supply as recited in claim 3, wherein said impedance matching is such that an impedance of said linear regulator matches an impedance of said voltage regulator at a frequency where impedance of said output capacitor begins to increase due to equivalent series inductance (ESL).

5. A power supply as recited in claim 1, wherein said voltage regulator is a switching voltage regulator.

6. A power supply as recited in claim 5, wherein said switching voltage regulator includes a buck converter.

7. A power supply as recited in claim 1, wherein said output capacitor is provided by at least one of at least one packaging capacitor and at least one on-chip capacitor.

8. A power supply as recited in claim 1, wherein said linear regulator is provided on a organic land grid array (OLGA).

9. A power supply as recited in claim 1, wherein said linear regulator is configured as a point-of-load supply.

10. A power supply as recited in claim 1, wherein said parallel connection of said capacitor and said linear regulator form a hybrid filter and wherein said amplifier includes a push-pull configuration of transistors which are operated in the forward active region.

11. A power supply as recited in claim 1, wherein said voltage regulator has a first frequency dependent impedance and said linear regulator has a second impedance and wherein said linear regulator functions as a current source in accordance with said first frequency dependent impedance and said second impedance.

* * * * *